(12) United States Patent
Ambrosi

(10) Patent No.: US 12,202,670 B2
(45) Date of Patent: Jan. 21, 2025

(54) STRUCTURE OF CLOSING PANELS TO BE FASTENED TO WALLS OF MODULAR STRUCTURES

(71) Applicant: AMBROSI S.R.L., San Giovanni Lupatoto (IT)

(72) Inventor: Thomas Ambrosi, Santa Maria di Zevio (IT)

(*) Notice: Subject to any disclaimer, the term of this patent is extended or adjusted under 35 U.S.C. 154(b) by 161 days.

(21) Appl. No.: 17/904,913

(22) PCT Filed: Feb. 24, 2021

(86) PCT No.: PCT/IB2021/051539
§ 371 (c)(1),
(2) Date: Aug. 24, 2022

(87) PCT Pub. No.: WO2021/171191
PCT Pub. Date: Sep. 2, 2021

(65) Prior Publication Data
US 2023/0078621 A1 Mar. 16, 2023

(30) Foreign Application Priority Data
Feb. 26, 2020 (IT) ........................ 102020000003985

(51) Int. Cl.
*B65G 1/02* (2006.01)
(52) U.S. Cl.
CPC ..................... *B65G 1/02* (2013.01)
(58) Field of Classification Search
CPC .. E04F 13/0816; E04F 13/083; E04B 2/7407; E04B 2/7453; E04B 2002/7466; B65G 1/02
See application file for complete search history.

(56) References Cited

U.S. PATENT DOCUMENTS

| 9,803,372 | B2 | 10/2017 | Griffiths | |
| 2006/0000187 | A1* | 1/2006 | Hager | E04B 2/7422 |
| | | | | 52/800.1 |
| 2015/0020468 | A1* | 1/2015 | Wickstrom | E04B 2/7457 |
| | | | | 52/745.1 |
| 2018/0094431 | A1* | 4/2018 | Koziol | E04F 13/081 |

FOREIGN PATENT DOCUMENTS

| EP | 2 101 018 | 9/2009 |
| FR | 46204 E * | 4/1936 |
| KR | 10-0987172 | 10/2010 |

* cited by examiner

*Primary Examiner* — Christine T Cajilig
(74) *Attorney, Agent, or Firm* — Withers Bergman LLP; Gina A. Bibby

(57) ABSTRACT

A structure of closing panels (33) to be fastened to walls of a modular structure having a substantially parallelepiped shape comprising four walls, supported by respective vertical uprights (31), comprises a series of horizontal cross bars, whereby each horizontal cross bar connects a pair of said vertical uprights (31). The structure comprises at least one section bar (32) joining a wall of the modular structure (30) to a panel (33), said at least one section bar being associated with a respective horizontal cross bar of the structure, whereby said at least one section bar (32) has a substantially (omega) Ω-shaped section, and comprises notches (39) and seats (38) for inserting respective coupling (46) and fastening (45) means for respectively coupling and fastening a panel (33).

6 Claims, 6 Drawing Sheets

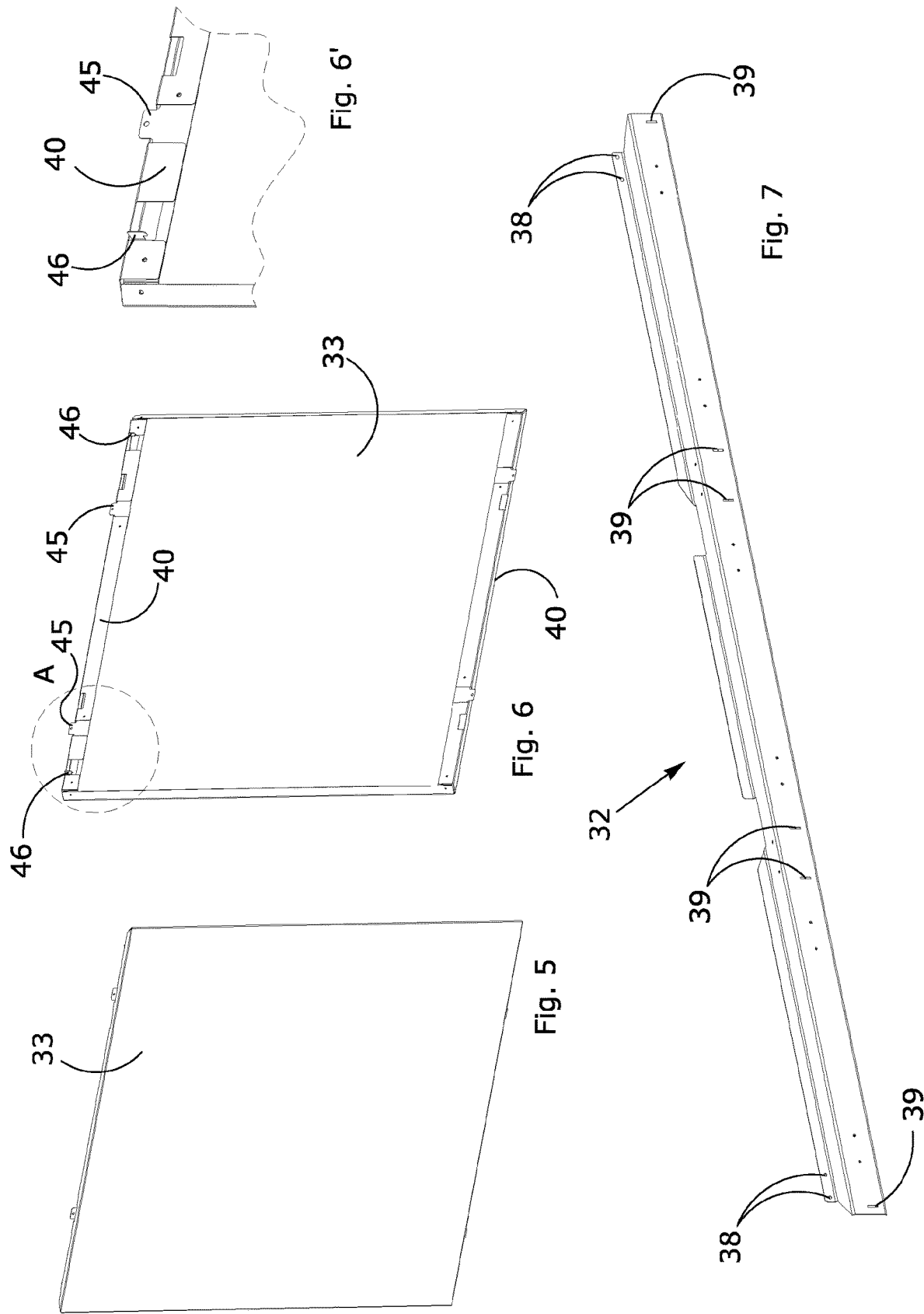

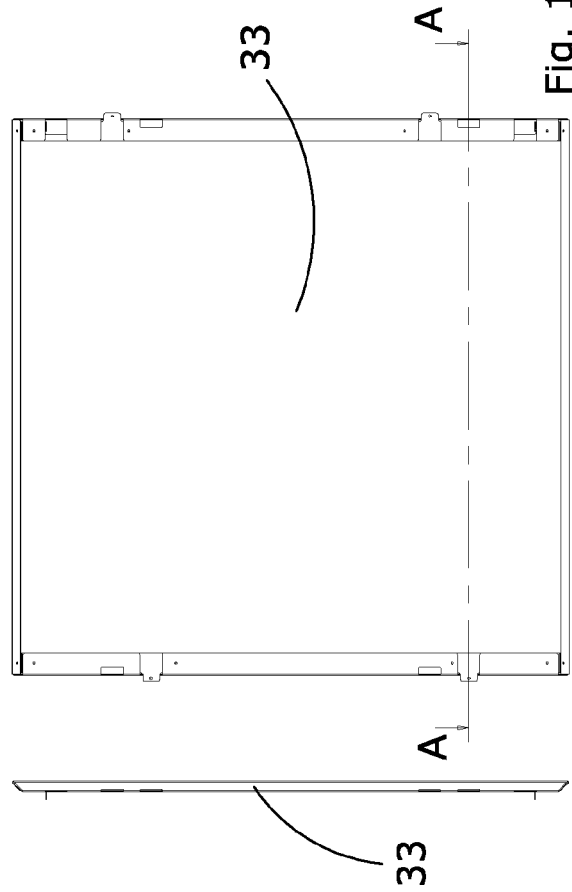
Fig. 10
Fig. 9
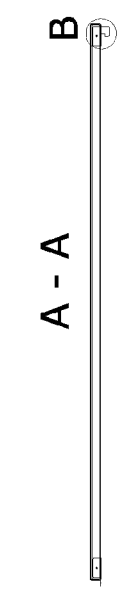
Fig. 11
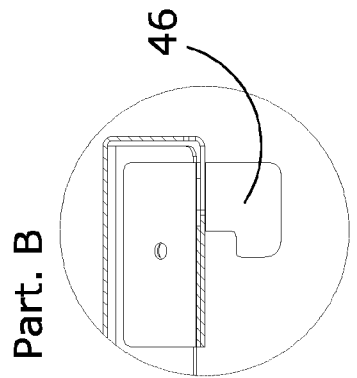
Fig. 13
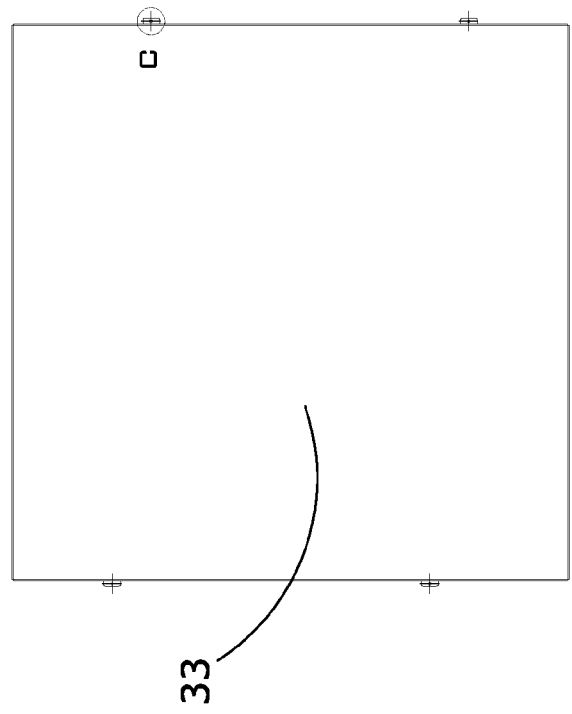
Fig. 8
Fig. 12

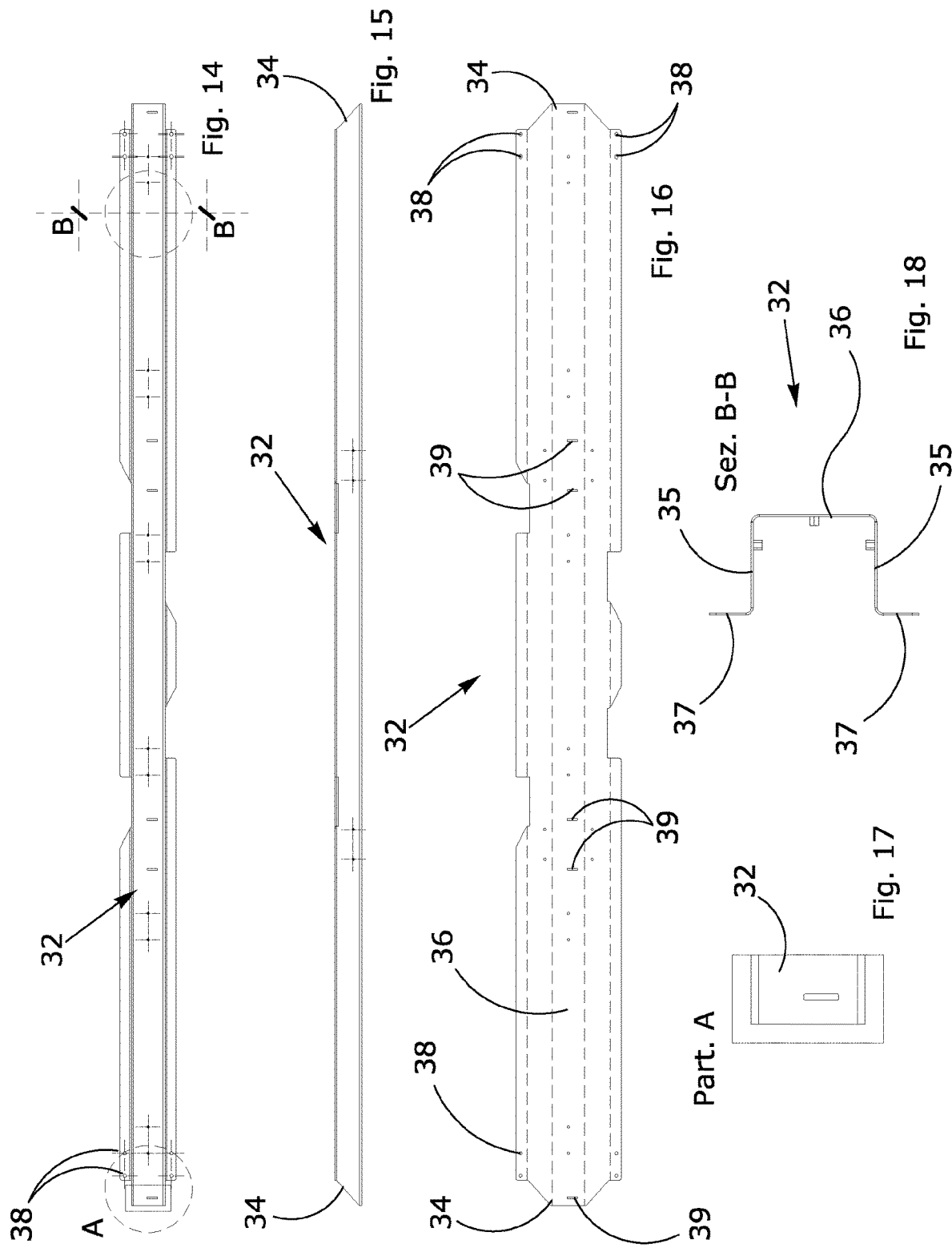

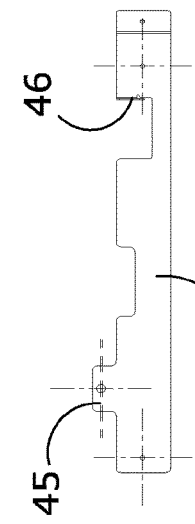
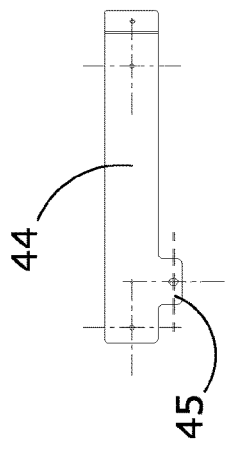
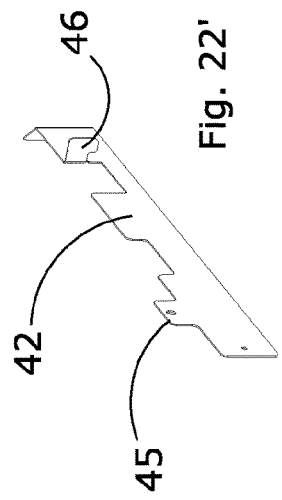
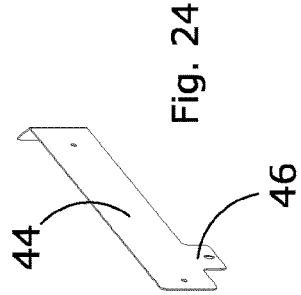
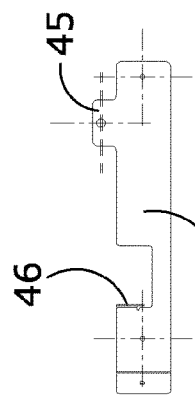
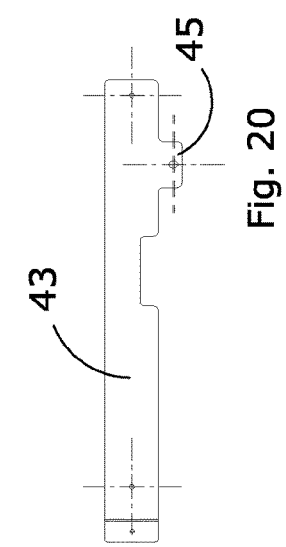
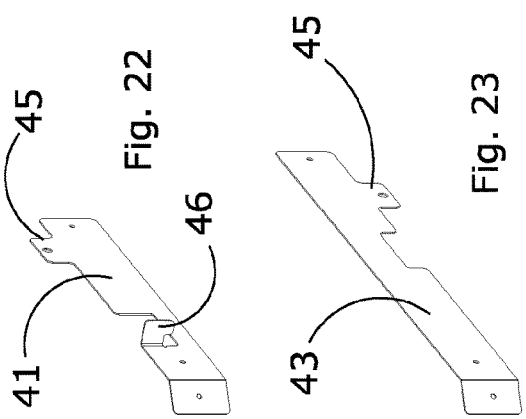

STRUCTURE OF CLOSING PANELS TO BE FASTENED TO WALLS OF MODULAR STRUCTURES

FIELD OF APPLICATION

The present invention relates to a structure of closing panels to be fastened to walls of modular structures such as, for example, those of automatic modular warehouses typically with a vertical arrangement for the storage of products and articles for industrial or other kinds of use.

More precisely, the invention relates to a structure of closing panels fastened to the walls of modular structures composed of a plurality of storage units each of which comprises a plurality of shelves in which drawers are arranged, each of which can be individually picked up by a movable system control and management unit that allows the filling and picking up of the articles or components contained.

The structure according to the invention intends to provide the possibility to quickly and simply cover the external walls of such structures so as to modify the external appearance thereof, hiding the contents and at the same time making it possible to perform the replacement or opening of the panels themselves in order to perform any maintenance works on the internal modular structures.

The present invention is advantageously applied in the sector of systems for covering or closing or covering modular structures such as those of warehouses used for storing goods and/or classified components with automatic management, which can be used in the industrial field.

PRIOR ART

In the industrial sector, the use of modular structures such as those related to automatic warehouses for storage is known, i.e. the storage and picking up of industrial products contained inside drawers arranged on various levels that can be inserted or extracted from the respective housings for their use, where required, e.g. for the assembly of articles to be sold.

In particular, traditional automatic warehouses known up to now comprise at least one warehouse, i.e. a sort of shelf formed by uprights and cross bars between which a series of overlapping horizontal guides is placed in which respective shelves, or drawers, or ledges are housed, provided to contain the industrial products to be used in the production activity for which they are intended.

The horizontal shelves or drawers are placed on the horizontal guides located at predefined distances on the vertical flanks that rise from a bottom floor finishing in the highest part where there is a roof that unites them.

The prior art is also aware of semi-automatic systems for managing the loading and unloading of the components stored in the warehouse.

These systems, which are essentially adapted to facilitate the manual work of the warehouse operators, usually make use of automatic movement and management devices that comprise a shuttle that is located, by means of a forklift truck, inside the storage corridor.

The prior art definitively requires the warehouse shelves to be sized also as a function of the movement systems and devices that are to be used.

For these purposes, such structures are made by assembling uprights and cross bars that form the framework, inside which the various shelves are located containing the drawers and the movement means of the latter which are picked up and inserted according to requirements.

The side walls of such structures are the last components that are applied and their installation must envisage respecting the modularity of the various structural components that are moved towards each other, i.e. they must comprise extremely simple joining means from the point of view of their operating use, so as to enable them to be easily replaced or moved according to requirements, and at the same time be effective from the point of view of sealing on the faces for which they are intended.

It is currently known to use covering panels that are mounted onto a support structure comprising various brackets mounted directly onto the structure, one or more vertical uprights that can each be coupled to a respective bracket and coupling means for connecting each covering panel to the vertical uprights that compose the covering structure.

Generally, the support structure comprises a plurality of brackets that can be associated with the vertical uprights that can be firmly coupled to each bracket by means of bolts. Furthermore, the structure comprises a coupling means, snap-fit or the like, that is coupled to the section bar, along one or more of the longitudinal grooves thereof, onto which the panels themselves are applied.

These solutions envisage that the longitudinal grooves present along the vertical uprights enable the connection both with the brackets and with the coupling means, where the grooves are also used to make any adjustments of the distance of each upright from the wall of the structure.

A problem encountered when using these solutions is related to their difficult use, being laborious, especially considering the case in which it is envisaged that the panels applied must be removed or moved from their location to satisfy different requirements with respect for modularity.

Document U.S. Pat. No. 9,803,372 B2 discloses a wall panel system for attachment to a building surface including a plurality of generally vertical supports, and a plurality of generally horizontal mounting rails interconnected with the vertical supports to define a panel mounting gridwork. The horizontal mounting rails have an upper mounting feature and a lower mounting feature, on a side opposite from the building surface. A plurality of panels each have a rear surface, an upper extrusion mounted to a top of the rear surface, and a lower extrusion mounted to a bottom of the rear surface. The upper extrusion mates with a corresponding lower mounting feature on the gridwork, and the lower extrusion mates with a corresponding upper mounting feature on the gridwork. The plurality of panels has a gap about a periphery thereof relative to any adjacent panels, whereby the panels can be non-sequentially mounted to the gridwork.

DESCRIPTION OF THE INVENTION

The present invention sets out to provide a new structure of closing panels fastened to walls of modular structures, such as those of automatic modular warehouses typically with a vertical arrangement for the storage of products and articles for industrial or other kinds of use, which is able to eliminate the drawbacks highlighted above.

The invention sets out in particular to provide a structure of closing panels fastened to the walls of modular structures which is simple to perform, has contained production costs and having mechanical characteristics such as to enable simple quick coupling operations and, as required, also quick release in maximum safety conditions.

This is obtained thanks to a structure of closing panels fastened to the walls of modular structures having the features described in claim 1. The dependent claims outline advantageous forms of embodiment of the invention.

According to the invention, it is envisaged that on the frame of the modular structure to be covered by panels shaped section bars are installed which comprise suitable seats co-operating with coupling means for a plurality of wall closing panels.

Said coupling means are represented by hanging hooks and locking tongues located along the edges of the panels themselves.

An important advantage of this solution is provided by the fact that every panel can be coupled and uncoupled independently from the other panels, as the locking means are accessible through slots made between each panel and each of the adjacent panels.

A further advantage offered by the support structure for panels according to the invention is provided by the presence on each panel of a pre-coupling means represented by hooks that are inserted into relevant seats provided on shaped section bars, so that each panel can be first coupled by hanging and later locked into position through the introduction of screws or the like.

ILLUSTRATION OF THE DRAWINGS

Additional features and advantages of the invention will become apparent from reading the following description of a form of embodiment of the invention provided by way of non-limiting example, with the aid of the figures illustrated in the appended drawings, in which:

FIGS. 5 and 6 illustrate perspective views, front and rear views respectively, of one of the panels according to the invention applicable to a modular structure;

FIG. 6' represents a magnified view of the notches depicted in FIG. 6;

FIG. 7 represents the schematic axonometric perspective view of one of the shaped section bars which comprise relevant seats for the application of the coupling means of a plurality of wall closing panels;

FIGS. 8 to 11 represent further schematic views, respectively front, rear and lateral, of one of the panels according to the invention;

FIG. 12 represents the front schematic view of the extension of one of the panels according to the invention;

FIG. 13 illustrates the detailed view of one of the hanging hooks applied to the edge of one of the panels according to the invention;

FIGS. 14 to 18 represent schematic perspective and sectional views of one of the shaped section bars that comprise relevant seats for the application of the panel coupling means;

FIGS. 19 to 21 illustrate views of strips applicable to the edges of the panels according to the invention, comprising a coupling means of the panels themselves onto the respective section bars;

FIGS. 22 to 24 show axonometric perspective views of the strips themselves.

DESCRIPTION OF AN EMBODIMENT OF THE INVENTION

Figure 1:
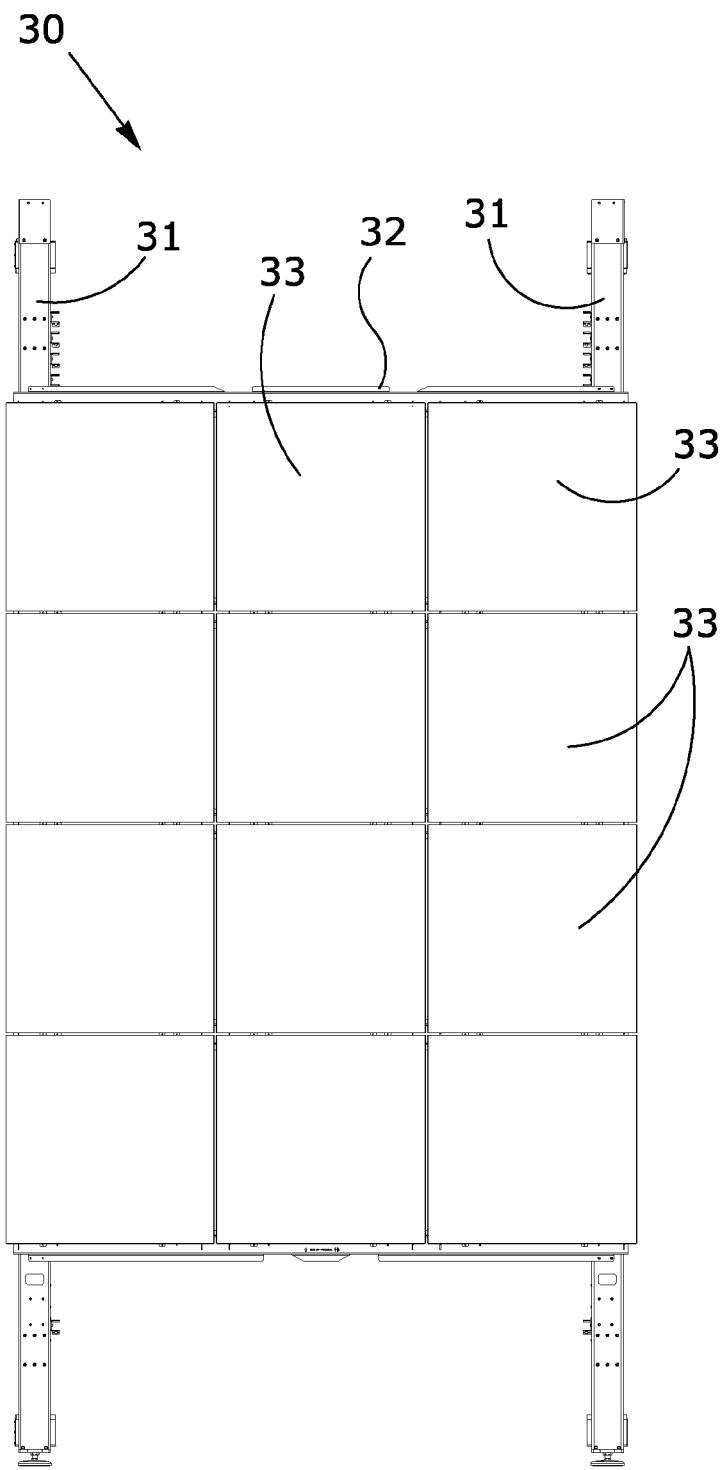
FIGS. 1 and 2 represent two schematic views, front and side views respectively, related to a face of a modular structure onto which the panels according to the invention are applied.
Figure 2:
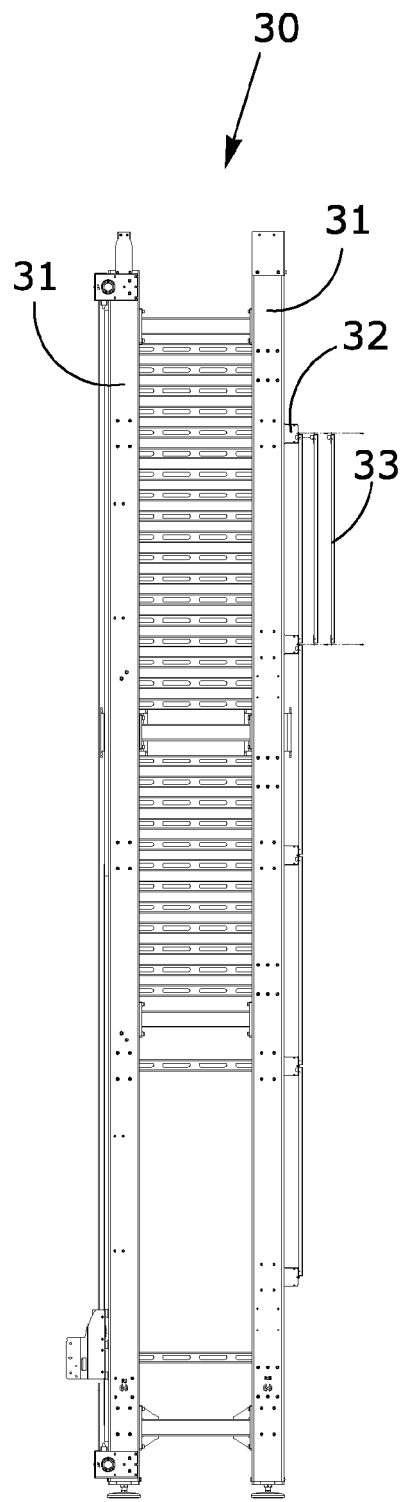
Figure 4:
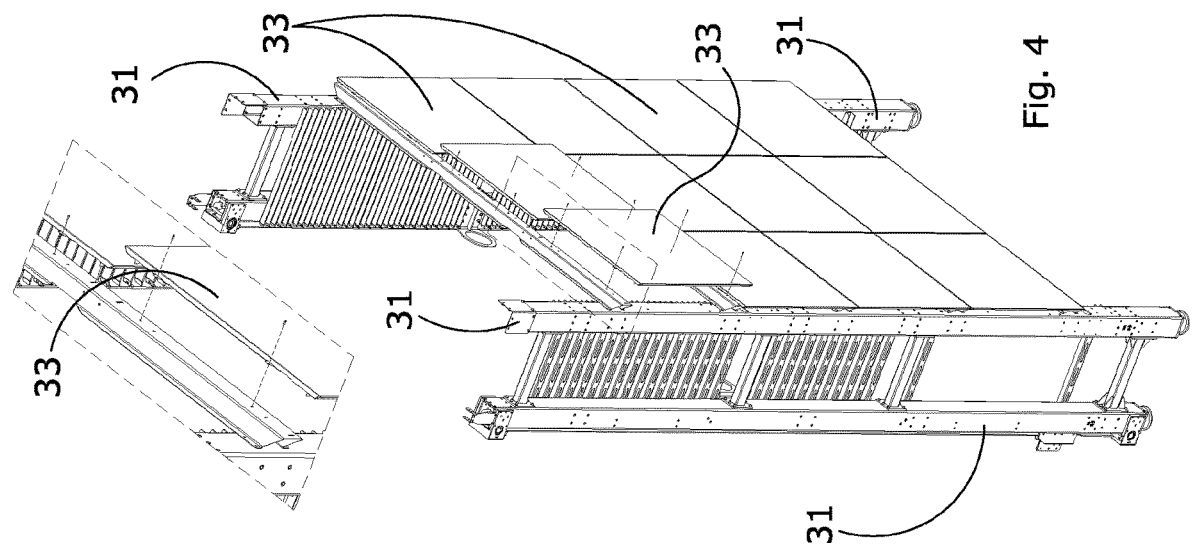
FIGS. 3 and 4 illustrate two further schematic axonometric perspective views of the same faces of a modular structure onto which the panels according to the invention are applied.
Figure 3:
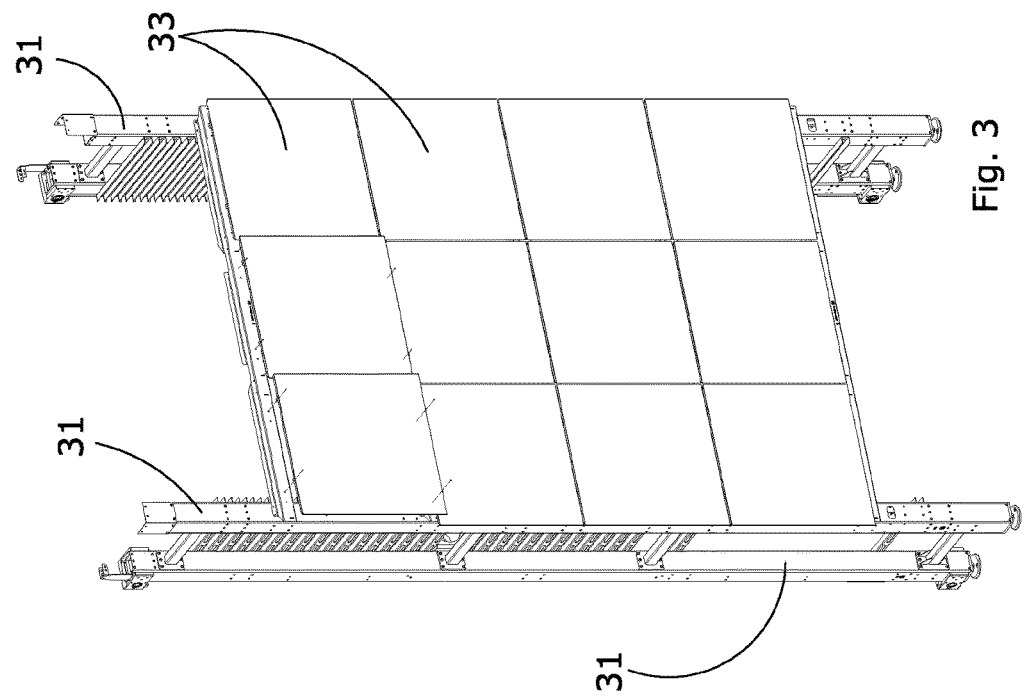

With reference to the appended figures, and initially in particular to FIGS. 1 and 2, number 30 generally indicates the face of a modular structure that can for example be represented by a vertical warehouse having a substantially parallelepiped shape comprising four sides, opposite two by two, supported by respective vertical uprights 31, comprised between a lower resting surface and an upper closing roof in the top part.

Considering that any modular structure can be used, reference number 32 indicates in all the figures a section bar that represents a joining element between the walls of the modular structure 30 and each of the covering panels indicated with 33.

More in particular, according to the embodiment illustrated in FIGS. 7, 14, 15, 16, 17 and 18, the section bars 32, made of metal material, are obtained from an extension, represented in FIG. 16, with a substantially elongated rectangular conformation with shaped ends 34 which, in use, form smoothed edges that go from the outside towards the inside, as shown in FIG. 15.

Each of the section bars 32 is shaped to assume a substantially (omega) Ω-shaped conformation as shown in FIG. 18 which relates to the section B-B of FIG. 14, and has two parallel edges 35 connected by an orthogonal edge 36 and finishing at the two ends with two opposite parallel strips 37 that form the resting base for the modular structure.

The section bars 32 are applied to the cross bars of the modular structure which can be glimpsed in FIGS. 1 and 2 as they are applied orthogonally between two adjacent uprights 31 placed on the same side of the modular structure 30. For fastening the section bars 32 onto the respective cross bars the two parallel strips 37 are rested thereon, which are provided with holes 38 that are crossed by screwing means that penetrate into holes made on the cross bars, so that the section bars can remain locked thereto.

According to the embodiment shown in FIGS. 7, 16 and 17, on the orthogonal edge 36 of the section bar 32, notches 39 are provided, which enable the insertion of relevant couplings projecting towards the inner side of the panels 33, as can be seen below.

With reference to a first embodiment, the panels 33, which have a substantially quadrilateral shape, comprise a means adapted for the application and fastening onto the section bars 32 provided as described above.

More in particular, with reference to FIGS. 5 and 6, the panels 33 have edges 40 turned towards the inside, obtained through bending of their vertical edges by 180°. The bent edges 40 are slightly distanced with respect to the internal surface of the panel, so as to house therein coupling and retaining means onto the section bars 32.

FIGS. 19 to 24 show such coupling and retaining means which, according to a first embodiment comprise strips 41, 42, 43 and 44 with different shapes according to their location on the horizontal edges of the panels 33.

All the strips 41, 42, 43 e 44, comprise at least one projection 45 protruding upwards and at least two of them, 41 and 42, comprise a further projection 46 bent by 90° with respect to the surface of the respective strip and shaped with an appendage turned downwards that forms a sort of hook.

The hook-shaped coupling projections 46 are intended to be inserted into notches 39 of the section bars 32 for hanging the panels prior to the locking thereof, whereas the projections 45 comprise a hole that can be crossed by screwing means, intended to be introduced into respective holes afforded on the section bars 32.

The strips 41, 42, 43 and 44 are, as mentioned, introduced into the bent edges 40 of the panels 33, which edges as shown in FIGS. 6 and 6', are provided with suitable notches that enable the exit both towards the outside of the fastening projections 45 in the parallel direction to the plane of the panels, and towards the inside of the hook-shaped coupling projections 46 in the orthogonal direction with respect to the plane of the panels themselves.

According to further embodiments it is also envisaged that the strips 41, 42, 43 and 44, provided with fastening projections 45 and hook-shaped coupling projections 46 in the orthogonal direction with respect to the plane of the panels themselves, are comprised on the same edge 40 of the panel or in any case forming a single body therewith, in order to simplify the operations of making each panel.

From an operating point of view, for applying the panels 33 to the modular structure 30 it is sufficient to fasten the section bars 32 to the respective cross bars and hang each panel by introducing the hook-shaped coupling projections 46 into the notches 39 and locking them by introducing a screwing means through the holes in the fastening projections 45 that are inserted into respective holes in the section bars 32.

It is to be noted that the dimensions of the panels 33 are calculated so that when they are moved towards each other the parallel edges that face each other are kept spaced out so as to always be able to have access with tools to the screwing means of the fastening projections 45 which can be removed, at the same time enabling the release of the hook-shaped projections 46 by lifting the panel, in the event in which it is necessary to remove or replace one or more panels, which therefore remain independent from one another.

The invention claimed is:

1. A structure of closing panels applicable to walls of a modular structure having a substantially parallelepiped shape comprising four walls, the structure of closing panels being supported by respective vertical uprights and a series of horizontal cross bars, whereby each horizontal cross bar connects a pair of the respective vertical uprights, wherein the structure of closing panels comprises at least one closing panel and at least one section bar joining a wall of the modular structure to the at least one closing panel, the at least one section bar being associated with a respective horizontal cross bar of the modular structure, wherein the at least one section bar comprises a substantially (omega) Ω-shaped section and notches and seats for inserting respective coupling and fastening elements for respectively coupling and fastening the at least one closing panel, each at least one closing panel having at least one edge provided comprising the coupling elements as projections bent by 90° with respect to a surface of the at least one closing panel, as well as with the fastening elements as projections parallel to the surface of the at least one closing panel, the coupling and fastening elements being configured to allow first coupling and then fastening each at least one closing panel to a respective at least one section bar, wherein the coupling and fastening elements for coupling and fastening the at least one closing panel on the respective at least one section bar comprise at least one strip, the at least one strip comprising at least the coupling and fastening elements, wherein the at least one edge of the at least one closing panel is provided with notches allowing the passage of both the coupling elements in a direction at right angles with respect to the plane of panel, and the fastening elements in a direction parallel to the plane of at least one closing panel.

2. The structure of claim 1, wherein the at least one edge of the at least one closing panel has an inwardly bent configuration and accommodates the respective coupling and fastening elements for coupling and fastening the at least one closing panel to the respective at least one section bar.

3. The structure of claim 2 wherein the at least one strip is accommodated inside the at least one bent edge and comprises at least the coupling and fastening elements.

4. The structure of claim 1, wherein the coupling element projection is shaped with an appendage forming a hook.

5. The structure of claim 4 wherein the coupling element projection is configured to be inserted into a notch of a respective at least one section bar to retain at least one closing panel before fastening it to the section bar through the fastening element.

6. The structure of claim 1, wherein each fastening element comprises a hole that can be intercepted by a screw configured to fasten at least one closing panel to a respective at least one section bar.

* * * * *